T. RODMAN, R. L. HIBBARD & H. A. CARPENTER.
APPARATUS FOR CHARGING AND DISCHARGING GAS RETORTS.
APPLICATION FILED MAY 22, 1905. RENEWED AUG. 22, 1911.

1,021,729.

Patented Mar. 26, 1912.

Witnesses,

Inventors

T. RODMAN, R. L. HIBBARD & H. A. CARPENTER.
APPARATUS FOR CHARGING AND DISCHARGING GAS RETORTS.
APPLICATION FILED MAY 22, 1905. RENEWED AUG. 22, 1911.

1,021,729.

Patented Mar. 26, 1912.

UNITED STATES PATENT OFFICE.

THOMAS RODMAN, OF SEWICKLEY, ROBERT L. HIBBARD, OF BELLEVUE, AND HENRY A. CARPENTER, OF SEWICKLEY, PENNSYLVANIA, ASSIGNORS TO RITER-CONLEY MANUFACTURING COMPANY, OF JERSEY CITY, NEW JERSEY, A CORPORATION OF NEW JERSEY.

APPARATUS FOR CHARGING AND DISCHARGING GAS-RETORTS.

1,021,729. Specification of Letters Patent. Patented Mar. 26, 1912.

Application filed May 22, 1905, Serial No. 261,681. Renewed August 22, 1911. Serial No. 645,392.

*To all whom it may concern:*

Be it known that we, THOMAS RODMAN, ROBERT L. HIBBARD, and HENRY A. CARPENTER, citizens of the United States, residing, respectively, at Sewickley, Bellevue, and Sewickley, in the county of Allegheny and State of Pennsylvania, have jointly invented a new and useful Improvement in Apparatus for Charging and Discharging Gas-Retorts, of which improvement the following is a specification.

Our invention relates to improvements in apparatus for charging and discharging gas retorts.

The object of our invention is to produce a machine, by the use of which gas retorts may be discharged of the coke contained therein, and substantially simultaneously therewith recharged with coal, one machine performing both operations, and keeping the retorts in constant use, and dispensing with the dual equipment heretofore employed to perform these operations.

We accomplish the object of our invention by the machine hereinafter more specifically described, which consists of a combined charger and discharger, which comprises two connected reversible scoops, which in its forward movement into the retorts performs the function of a ram to force or push the coke out of the retort; and immediately the coke has been discharged, by reversing the scoops, charge the coal contained therein into the retort, thus recharging the same, and other novel features of construction hereinafter more specifically described reference being had to the accompanying drawings forming part hereof, in which—

Fig. 1' is a detail of the rearward end of the ram and charger.

Referring to said drawings, *a* and *b* are, respectively, the base and the frame of the apparatus. 1 is a motor which is suitably mounted upon supports 2 secured in said frame, said motor having a shaft 3 on which is mounted a worm (not shown) which meshes with and communicates power to a worm wheel 4 mounted upon the upper end of the shaft 5 which is supported in suitable bearings formed in the brackets 6.

7 is a bevel wheel loosely mounted upon the shaft 5 which meshes with and transmits power to a bevel wheel 8 mounted on one end of the shaft 9, at such times as the said bevel wheel 7 is held rigid on said shaft 5 by means of the clutch 9', as hereinafter specified. The said shaft 9 is provided with a worm 10, which meshes with a worm gear 11 mounted upon the shaft 12 for the purpose of transmitting motion to the drum 13, which is likewise mounted on said shaft 12, and on or over which the chains 14 and 15 are wound for the purpose of elevating the hopper and all the mechanism for charging and discharging the retorts as hereinafter specified. On the lower end of said shaft 5 is loosely mounted a small horizontally disposed bevel wheel 16, which meshes with a vertically disposed bevel wheel 17, which is mounted upon one of the axles of the machine, for the purpose of transmitting power to the said axle at such times as the said wheel 16 is held rigid on said shaft 5 by means of the clutch 9', as hereinafter specified, for the purpose of propelling the machine along the bench of retorts. The chain 14 passes under a pulley 18, to a pulley 19, which is mounted in a bracket secured to the upper end of one side of the machine, thence over the pulleys 20, 21, 22 and 23 and is finally anchored or secured to a block *x* secured upon one side of the hopper A. The chain 15 passes over pulley 24 which is secured in suitable bearings supported on the side of the machine near the lower end thereof, thence over pulleys 25, 26, 27 and 28, and is finally secured to a block secured upon the side of the hopper opposite to that on which chain 14 is secured.

29 is a platform secured on the end of the ways 30, from which the levers which control the motive mechanism of the apparatus are readily accessible.

Figure 3:
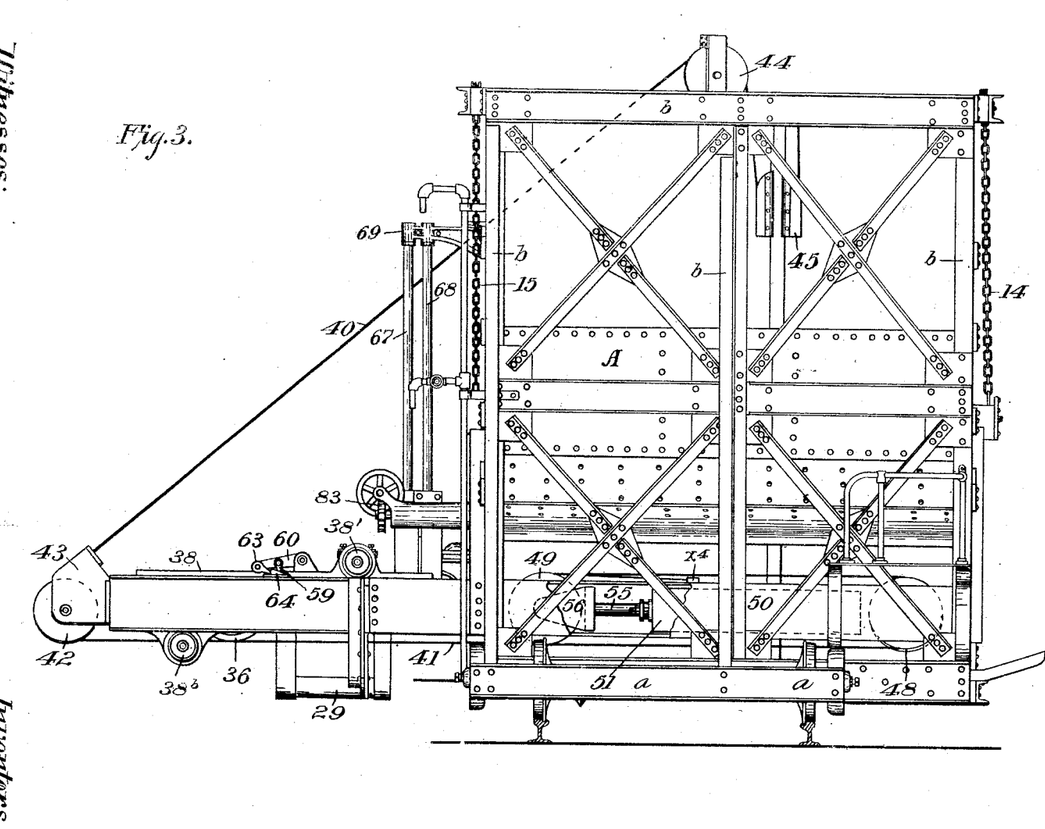
Fig. 3 is an elevation of the side opposite to that shown in Fig. 1.
Figure 4:
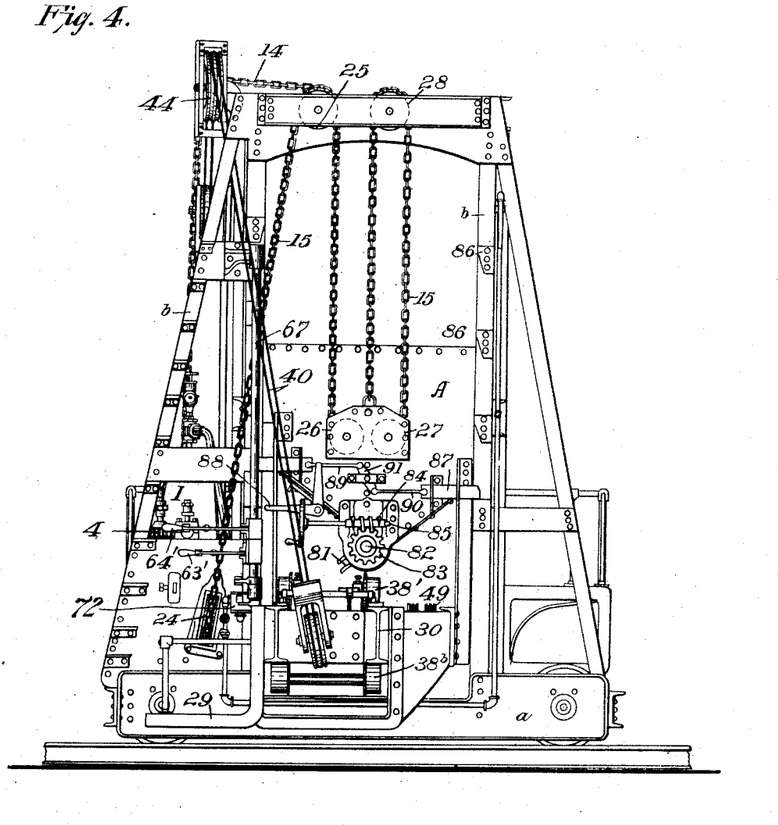
Fig. 4 is a rear elevation.
Figure 5:
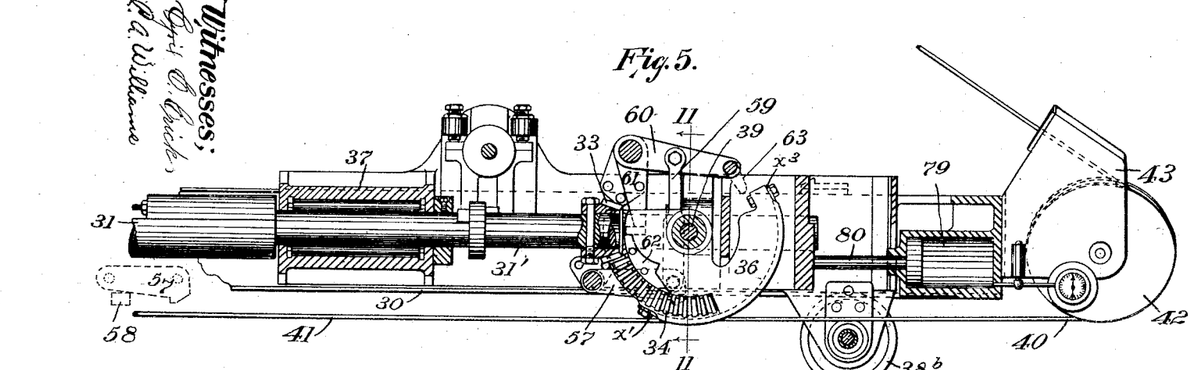
Fig. 5 is a longitudinal vertical section of the ram and charger and means for operating the same.
Figure 6:
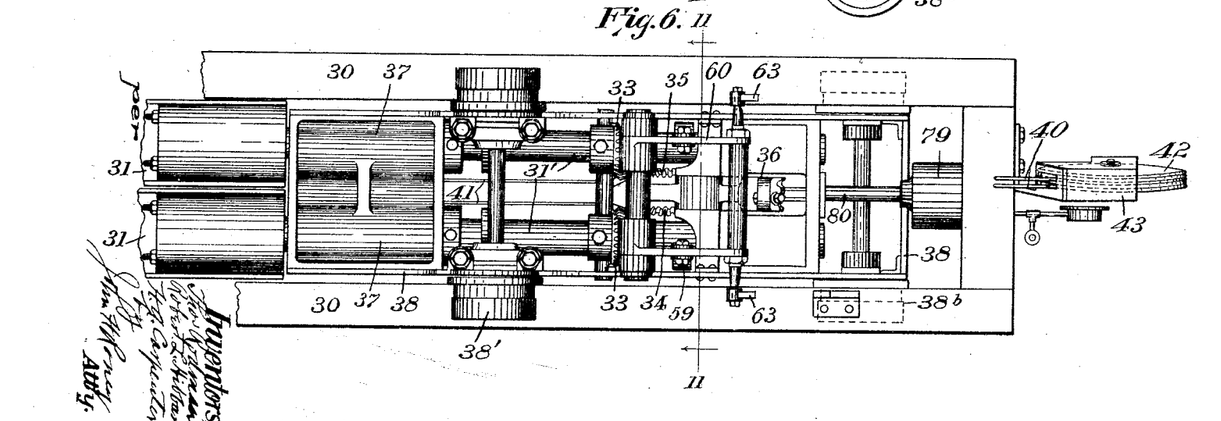
Fig. 6 is a plan view of the same.

The mechanism for charging and discharging the retorts comprises two connected reversible scoops 31, 31, each of which is provided with a shaft 31', the outer ends of which, respectively, are connected with the scoops; and the opposite ends of each are provided with a bevel wheel 33—33, adapted to mesh with the racks 34—35, respectively, formed on the outer sides of the segment 36. The said shafts are, respectively, supported in bearings 37, 37, secured upon and formed in the carriage 38, which is mounted on wheels 38' and 38$^b$ and travels on ways 30, which are suitably secured to the lower ends of the hopper A. The said segmental rack 36 is mounted on the shaft 39, and the ends thereof are, respectively, connected to the ropes 40, 41. The rope 40 is attached to said segmental rack at $x'$, passes under the lower edge of said segment to the pulley 42, which is journaled in the side walls of the hood 43 which is secured to the rear end of the ways 30, to and over the pulley 44, which is journaled in a bracket secured upon the top of the machine frame, from thence it passes under a pulley journaled in the upper end of the counter weight 45, and is finally anchored or secured at $x^2$ upon the upper frame of the machine. The rope 41 is secured to said segmental rack at $x^3$ and passes from said segment over the horizontally disposed pulley 46, onto, and over the pulley 47, to the pulley 48, thence over pulley 49, and is finally anchored or secured at $x^4$, to the top of the support 50, on which the ram 51, is secured. The piston 55 of said ram is connected at one end, by means of the block 56, with the sheaves or pulleys 47 and 49 which are movable with said piston, whereby when the piston is driven outwardly of the cylinder or ram, the carriage is caused to advance or travel toward the retorts (not shown), the scoops being advanced into the retorts, pushing the coke contained therein out of the retort at the opposite end. Immediately the scoops have completed the discharge of the coke, the forward movement of said scoops is arrested, and the engagement of the lock lever 57 with the abutment 58 on the forward end of the ways 30, causes the link 59 to move upwardly, thereby raising the lever 60. The under face of said lock lever being inclined, the engagement thereof on said abutment causes the arm 60, to swing upwardly, and swings the lock finger 61, which is pivotally connected therewith, out of engagement with the abutment 62, which is secured upon or is an integral part of the segmental rack, permitting the rack to be moved by the pressure or pull of the rope, and thereby rotating or turning the scoops, through the medium of the bevel wheels on the ends of the scoop shafts, which mesh with the said segmental rack, thereby reversing the scoops and discharging the contents thereof into the retorts. The reversal of the piston of the ram releases the pull on the segmental rack through the rope 41, and permits the counter weight on the outer end of the rope 40 (the opposite end of which is attached to the rack) to withdraw the scoops from the retort. The scoops when withdrawn from the retort occupy the position shown in Fig. 3 of the drawings; i. e., a short distance in advance of the proper position to receive coal from the hopper, the scoops being also inverted. When it is desired to advance the scoops immediately beneath the hopper and to bring them into position to receive coal therefrom, the operator admits motive fluid to the ram, which causes the piston thereof to move outwardly, thereby causing a pull upon the segmental rack through the rope 41. It will be observed that at this moment the pawls 63 are in engagement with the abutment 64 on the rear end of the ways, and that the continued pull on the rope and the engagement of the said pawl with said abutment, which prevents movement of the carriage, causes the release of the lock mechanism of the segmental rack, and permits the rack to turn, thereby reversing the position of the scoops through the medium of the bevel wheels, on the ends of the scoop shafts in engagement with the said rack.

Figure 1:
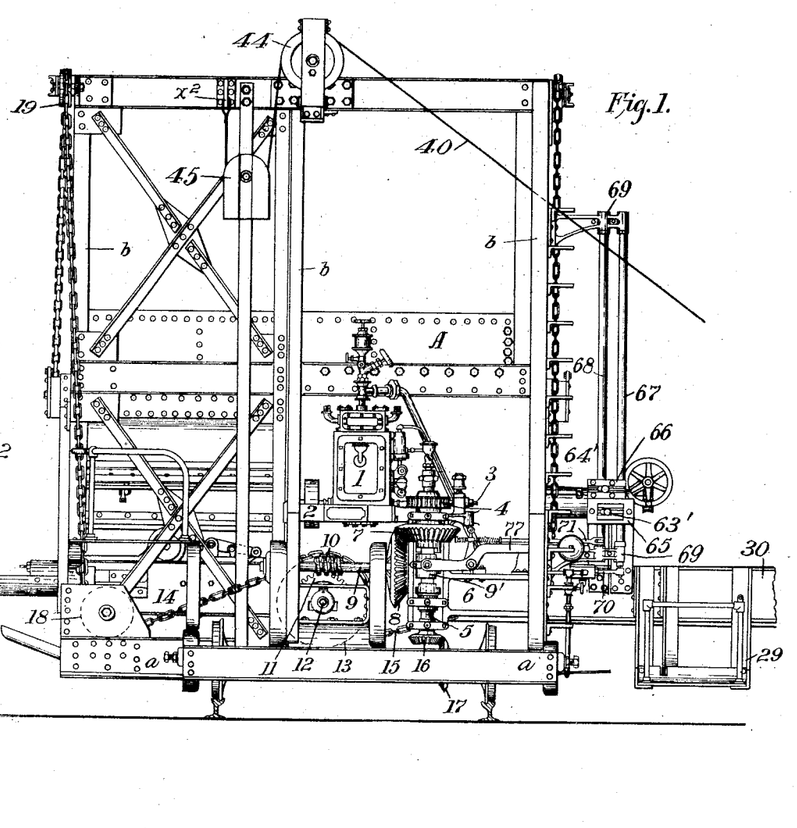
Figure 1 is a side elevation of our improved apparatus for charging and discharging gas retorts.
Figure 2:
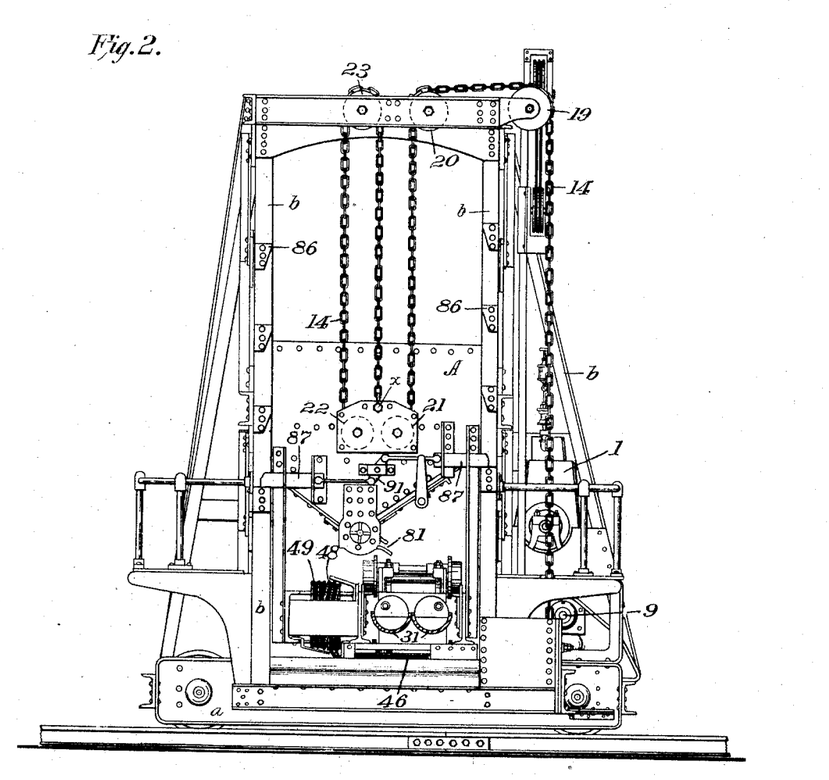
Fig. 2 is a front elevation.

63', 64' are levers which are mounted on the plates 65, 66, and are slidably connected with, respectively, the vertically disposed lever rods 67, 68, which are rotatably mounted in the brackets 69, 69. The said rods are, respectively, connected with the links or rods 70, 71, which, respectively, actuate valve mechanism 72, to control the admission of motive fluid to the motor, and the clutch 9'. The inner end of said rod 71 is slidably mounted in a bearing 74, formed in the upper end of the link 75, which is rigidly mounted on the shaft 76, on which the clutch lever 77 is secured. Spiral springs 78—78 are mounted on said rod 71, on each side of said bearing 74, and are for the purpose of holding the clutch in disengaged position shown in Fig. 1.

79 is a cylinder, secured upon the rear end of the ways 30, which is provided with a piston rod 80 and head secured thereto, which serves as a cushion to lessen the jar on the carriage, when said carriage contacts therewith on its reverse movement. The discharge opening 81 of the hopper is controlled by a closure mounted on the shaft 82, which extends longitudinally of the hopper, being secured in the sides thereof at the lower end. The said shaft 82 on one end thereof is provided with a worm wheel 83, which is adapted to be actuated by the worm 84 on the shaft 85, the said shaft having a hand wheel on one end thereof, for the purpose of rotating the same.

86 are a series of stops or abutments secured upon the frame at intervals against which the lock bar 87 is adapted to engage for the purpose of arresting the downward movement of the hopper and connected mechanism, the said lock bar being actuated by the lever 88, to which it is connected by means of the links 89—90 and the oscillating arm 91.

Figures 7, 8:
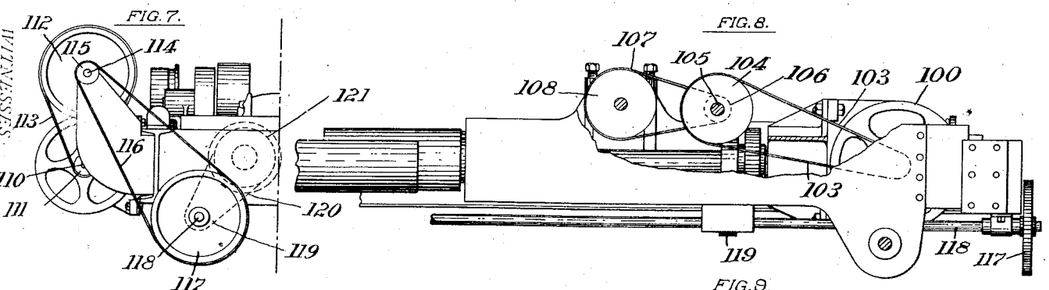
Fig. 7 is an end view of Figs. 8 and 9.
Fig. 8 is a side elevation partly in section of a modified form of mechanism for operating the ram, and charger.
Figures 9, 10:
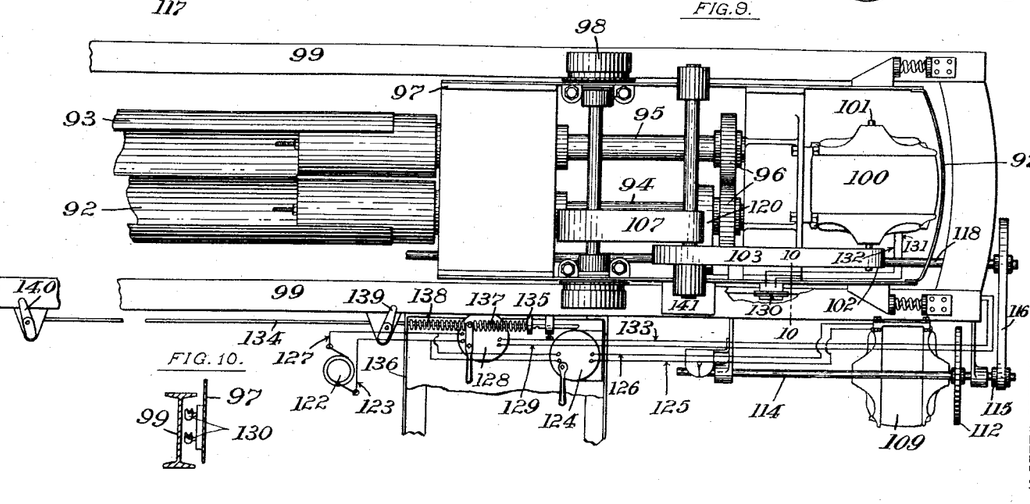
Fig. 9 is a plan view of Figs. 7 and 8.
Fig. 10 is a view on the line 10—10 of Fig. 9.
Figure 11:
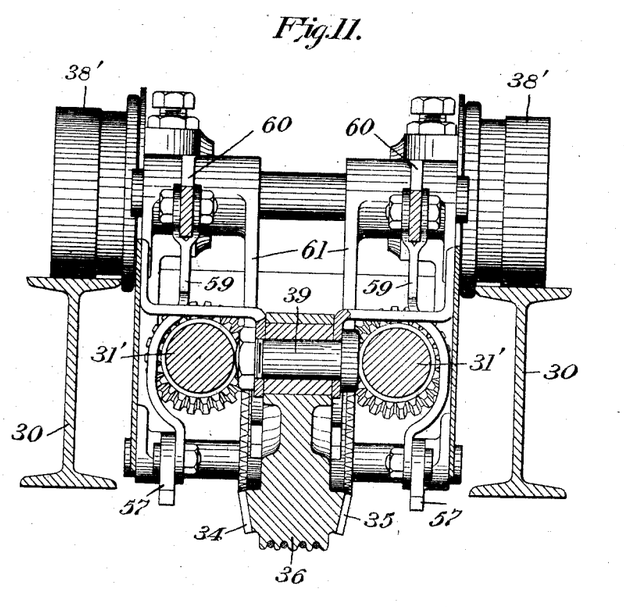
Fig. 11 is a transverse section on line 11—11 of Figs. 5 and 6.
Figure 12:
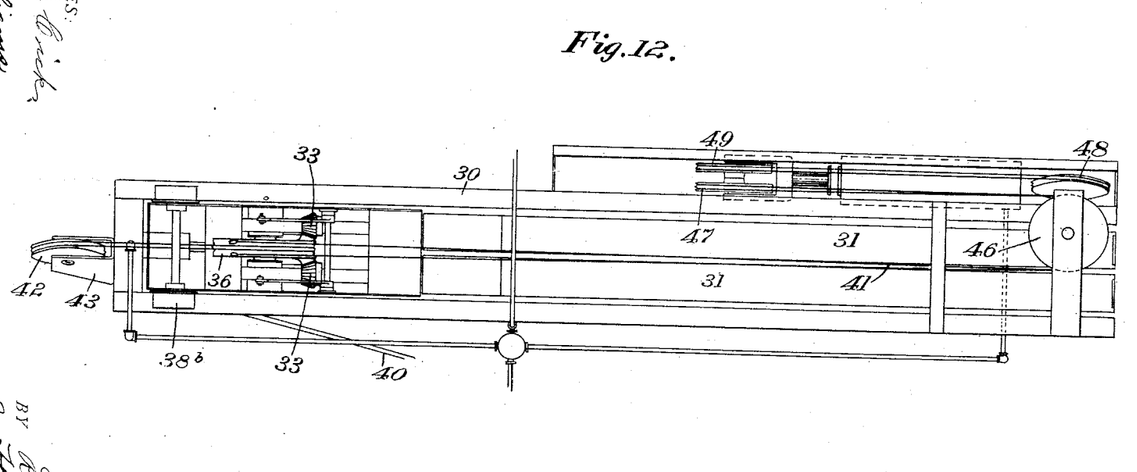
Fig. 12 is an inverted plan view of Fig. 6.
Figure 13:
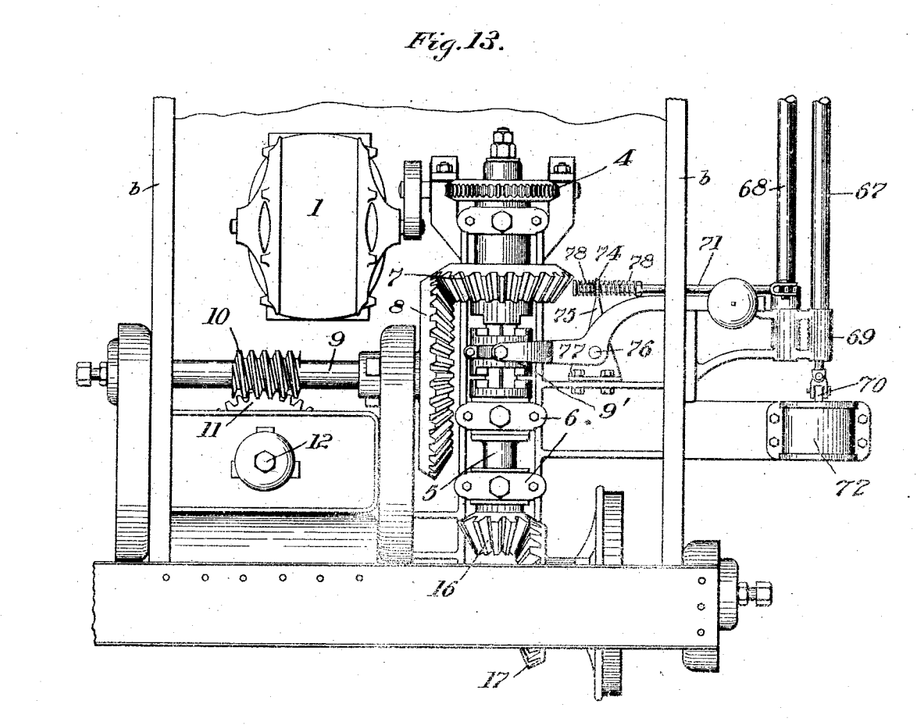
Fig. 13 is an enlarged view of modified form of mechanism for operating propelling motor.

In Figs. 7, 8 and 9 is shown a modified form of mechanism for manipulating the scoop; i. e., for turning and reversing the same; and means for automatically stopping the ram charger, under the hopper and at the end of its stroke. In these views the scoops 92—93 are connected to, respectively, the shafts 94, 95, the ends of which are provided with intermeshing gear 96, by means of which, as hereinafter specified, the scoops are turned and reversed. The carriage 97, which is provided with wheels 98, is adapted to travel on ways 99, and is propelled thereon by means of the electric motor 100, on the outer end of power shaft 101 on which is mounted a small belt pulley 102, which transmits power through the belt 103, to the large belt pulley 104, which is mounted on the shaft 105. A small belt pulley 106 is also mounted on said shaft 105, and transmits power through the belt 107, to a belt pulley 108 rigidly secured upon the front axle of the carriage, for the purpose of propelling the same. An electric motor 109, which is suitably mounted on the frame at one side of the carriage ways, is provided with a power shaft 110, on which a belt pulley 111 is mounted, which transmits power to the pulley 112 by means of belt 113, the said pulley 112 being mounted on shaft 114. On the extreme outer end of said shaft is also mounted a small belt pulley 115, which transmits power through the belt 116, to a belt pulley 117 mounted on the shaft 118, which extends longitudinally of the machine. A belt pulley 119, mounted on said last mentioned shaft, communicates power through the belt 120 to a belt pulley 121, mounted on the shaft 94, whereby the said shaft is turned or revolved, and through the intermeshing gear 96 the scoops are operated, or brought into position to receive coal, and to discharge the same into the retort. Electric energy is supplied to said last mentioned motor from the generator 122, or other source of electric supply, through the conductors 123, through the switch 124 to the conductor 125 to the motor, the circuit being completed, from the motor through the conductor 126, through the switch 124 to the conductor 127 to the generator. Electric energy is transmitted to the carriage propelling motor 100 from said generator through the conductor 123, through the switch 128 to the conductor 129, to and through the trolley 130, to the conductor 131, to said motor, the return current being through the conductor 132, to and through the trolley to the conductor 133, through the switch 128 to the conductor 127, to the generator. The said switch 128 is connected to a long rod 134, which is movably mounted in bearings secured to the carriage ways, and on which between a collar 135 and one side of said switch, and the opposite side of said switch and the flange of the frame 136, is mounted spiral springs 137 and 138. The said rod is connected with bell cranks 139, 140, arranged in the path of the carriage and adapted to be operated by the abutment 141 on the frame of said carriage, whereby the current to the motor is cut out when the apparatus is brought under the hopper to be charged, and when the charger has completed its forward movement into the retort.

We claim as our invention, and desire to secure by Letters Patent:

1. In an apparatus for charging and discharging gas retorts, the combination of a frame, means to propel said frame, mechanism mounted within said frame for conveying coal to a retort and substantially simultaneously therewith discharging the coke therefrom, means to charge the coal contained in said conveying mechanism into said retort, and to withdraw said mechanism from said retort, a hopper mounted in the frame of said apparatus, means to raise and lower said coal conveying and coke discharging mechanism, and means to control the discharge of coal from said hopper into said coal conveying mechanism.

2. In an apparatus for charging and discharging gas retorts, the combination of a frame, a motor mounted in said frame, a hopper, means to transmit power from said motor to the axle of said frame, means to transmit power from said motor to elevate said hopper, a hollow ram adapted in its forward movement to push out or discharge the coke contained in a retort, and means to substantially after the discharge of the coke from the retort recharge the same with coal contained in said hollow ram.

3. In an apparatus for charging and discharging gas retorts, the combination of a frame, means to propel said frame, mechanism mounted within said frame for conveying coal to a retort and substantially simultaneously therewith discharging the coke therefrom, means to charge the coal contained in said conveying mechanism into said retort, and to withdraw said mechanism from said retort, a hopper mounted in the frame of said apparatus, means to raise and lower said coal conveying and coke discharging mechanism, means to control the discharge of coal from said hopper into said coal conveying mechanism, and means to reverse the coal conveying mechanism to a position to receive another charge of coal.

4. In an apparatus for charging and discharging gas retorts, the combination of a frame mounted on wheels, a motor mounted in said frame, means to transmit power from said motor to the axle of said frame, a hopper to contain coal, a hollow ram disposed below said hopper, means to charge said ram with coal from said hopper, means to advance said ram against the coke contained in a retort and into said retort for the purpose of pushing or discharging the coke out of the retort at the opposite end and at the same time carrying into the retort a fresh charge of coal, means to discharge the coal from the ram into the retort after the discharge of the coke, and means to withdraw the ram from the retort upon the completion of the charging operation.

5. In an apparatus for charging and discharging gas retorts, the combination of a frame mounted on wheels, means mounted on said frame to propel the same upon said wheels, a hopper slidably mounted in said frame, a carriage mounted upon ways secured upon the lower portion of said hopper, a pair of semi-circular scoops adapted to contain coal to charge the retorts, means to reciprocate said scoops and means to simultaneously reverse said scoops to discharge the coal contained therein within the retort; a platform secured upon the rear end of the ways, a plate accessible from said platform and slidable upon vertically disposed rods, a number of levers connected to said rods and adapted to control the motive mechanism of said machine.

6. In a machine for charging and discharging gas retorts, the combination of a hopper, means to elevate and lower said hopper, a trough like receptacle adapted to contain the coal charge, means to move said receptacle into the retort, and after the discharge of the coke, recharge the retort with coal, means to elevate and lower said receptacle, and means to automatically stop the same at predetermined points.

7. In a machine for charging and discharging gas retorts, the combination of a frame, means to move said frame along the retorts, means to convey coal to said retorts and at substantially the same time discharge the coke therefrom, means to charge the coal contained in said conveyer into said retort after the discharge of the coke therefrom, means to raise and lower said coal conveying and coke discharging mechanism, a platform adapted to be raised and lowered with said coal conveying and coke discharging mechanism, and means to control the motive mechanism of the apparatus accessible from said platform.

In testimony whereof, we have hereunto signed our names in the presence of two subscribing witnesses.

THOMAS RODMAN.
ROBERT L. HIBBARD.
HENRY A. CARPENTER.

In the presence of—
CLARENCE A. WILLIAMS,
JAMES C. HERRON.

---

Copies of this patent may be obtained for five cents each, by addressing the "Commissioner of Patents, Washington, D. C."